March 1, 1938. S. D'AYGUESVIVES 2,109,691
PNEUMATIC TIRE
Filed March 13, 1933   2 Sheets-Sheet 1

Inventor
Serge D'Ayguesvives
Benjamin F. Cruppen
Attorney

March 1, 1938.  S. D'AYGUESVIVES  2,109,691
PNEUMATIC TIRE
Filed March 13, 1933  2 Sheets-Sheet 2

Inventor:
Serge D'Ayguesvives.
Benjamin F. Wupper
Attorney.

Patented Mar. 1, 1938

2,109,691

UNITED STATES PATENT OFFICE 2,109,691

PNEUMATIC TIRE

Serge d'Ayguesvives, Paris, France

Application March 13, 1933, Serial No. 660,555
In France March 12, 1932

9 Claims. (Cl. 152—14)

(Granted under the provisions of sec. 14, act of
March 2, 1927; 357 O. G. 5)

Application has been made in France on the 12th March, 1932, No. 733,470.

One object of the present invention is to increase the adherence on the ground of pneumatic or other tires, especially when, after a certain time of use, the tires have their surfaces partially or entirely smooth.

Another object of the invention is to cause the rupture of the film of water which is found between the tread and the ground when the latter is smooth and wet. The said film constitutes a proper lubricant which reduces the adherence of the tire, and the rupture of the film allows the tire to have the same adherence on wet ground as it would have in dry weather.

In order to obtain this result, there are provided in the surface of the tread of the pneumatic or other tire, grooves or channels formed in such a manner that the tire bears on the ground through a series of sharp edges, or the supporting surface of the tire on the ground forms a series of sharp edges when it is flexibly deformed under the action of the tangential reactions of the ground.

Another characteristic of the invention is that the grooves or channels are formed in the surface of the tire, irrespective of material, either mechanically or by a heating process.

Another characteristic of the invention is that the said grooves or channels are formed in the surface of the tread by one or more saws, fraising tools or milling cutters turning at great speed.

Another characteristic of the invention is that the grooves formed in the tread are straight or curved but are transverse to the tire.

Another characteristic of the invention is that the grooves are formed in such a manner that they can empty themselves of the water which is introduced into them when in contact with the ground, either by making the grooves open out at the sides of the tire or by connecting them by circular channels passing around the tire.

According to one constructional form, the section of the grooves through the median plane of the tire is of symmetrical or asymmetrical triangular section so that the tire will bear on the ground at the sharp edges thus formed.

According to another constructional form, the section of the grooves is rectangular, their width, their spacing and their depth being such that, under the effect of the tangential reaction of the ground, the bands or strips formed between the grooves can bend over whilst being supported one on the other and thus present a series of sharp edges in contact with the ground.

The annexed drawings show, by way of example, methods included in the invention and apparatus for carrying out the methods.

On the drawings:—

Figure 1:
Fig. 1 is a section of one form of groove through the central plane of the tread.

Referring to Fig. 1, in the surface of the tire there have been formed contiguous channels 1—1 of triangular section, in such a manner that the tire will rest on the ground at the sharp edges 2—2. The section of the channels can be symmetrical or asymmetrical in the form of saw teeth, their width and their depth being determined according to the tire loading in such a manner that, in no case can the bottom of the channels touch the ground. To that end, under the action of the tangential reactions, the teeth can be deflected slightly without ceasing to present sharp edges in contact with the ground.

Figure 2:
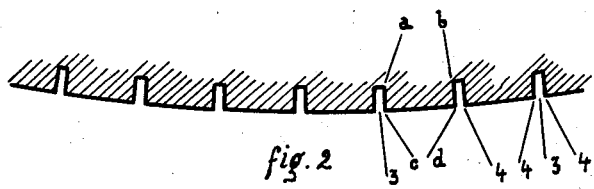
Fig. 2 is a section of another form of groove through the central plane of the tread.
Figure 3:
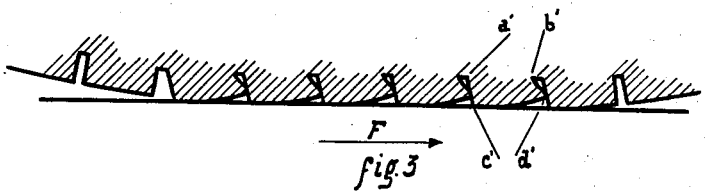
Fig. 3 is a section corresponding to Fig. 2 but with the wheel resting on the ground, and thus subjecting the parts of the tread to tangential reactions.
Figure 4:
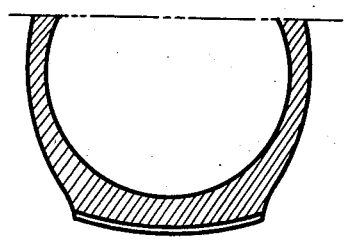
Fig. 4 is a transverse section through the pneumatic tire.

In the construction shown in Figs. 2 and 3, the grooves 3 are perpendicular to the central plane of the tire and are of a constant depth from one edge to the other of the tire.

Each groove has two parallel walls which meet the surface of the tread and form two sharp edges 4—4.

When a tangential force F is transmitted by the ground to the surface of the tire, each of the rubber strips comprised between two grooves and whose section is, for example, $a, b, c, d$, is deformed as shown in Fig. 3 at $a', b', c', d'$ and, in consequence of the relation between the width and the height of the strip and in consequence also of the suitable dimension given to the grooves, the strip bears against the adjacent strip. As will be observed from an examination of Fig. 3, the grooves are formed with their depths considerably greater than their widths so that when the strips or blocks between the grooves tilt or yield tangentially under driving strain, the forward sides of the tilted strips will contact with the rear sides of the next forward strips, thereby limiting the amount of tilting. By varying the widths of the grooves the angles at which the tilted strips contact with the ground may be varied to obtain any degree of angularity desired. Obviously, the grooves must be of less width than their depths in order to effect this contact between adjacent strips.

The result is that the displacement and the deformation of each of the strips in contact with the ground are limited.

Each of the deformed strips has a sharp edge in contact with the ground and the tire assumes the form of saw teeth which considerably assist its adherence, whilst the sharp contact edges cause the rupture of a film of water which may exist between the tire and the wet ground.

The fact that the successive strips cut in the surface of the tread bear against each other and thus have their displacement limited by the width of the grooves, is a novel and characteristic result of the invention. When, in fact, the grooves are very large, it is impossible to bring them together sufficiently in order that the strips which they cut can have sufficient elasticity without lying over under the action of the tangential effort and very rapid and irregular wear of the tread would be observed.

On the other hand, if the strip comprised between two adjacent grooves is sufficiently wide and rigid so as not to be able to bend over in a squeezed manner under the action of a tangential effort, the formation of a profile in the form of saw teeth will not be produced and there will be an insufficient adherence, especially on wet ground.

It has been found that, in order to obtain these results, the grooves must be perpendicular to the central plane of the tread or slightly inclined thereto and their width should not exceed 3 millimetres.

The depth must be at least equal to the width and be less than five times the width.

The spacing of two grooves can be comprised between one and a half and fifteen times the width of the said groove.

The ends of the grooves must have an edge as sharp as possible.

For example, in the case of a pneumatic tire for a touring vehicle with a load of 500 kilograms, the width of the grooves will be 1.5 millimetres, their depth 3 millimetres and their spacing 6 millimetres.

Figure 5:
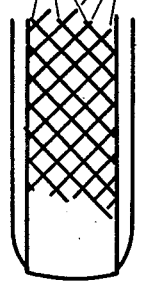
Figs. 5, 6, 7, 8 and 9 are front views of tires having different forms of grooves.

The grooves or channels thus traced on the surface of the tread could be straight or curved and they can be arranged in two directions G and H slightly inclined to the central plane of the tread, as shown in Fig. 5.

Figure 6:
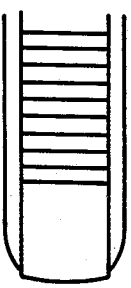

They can be perpendicular to the central plane, as shown in Fig. 6.

Figure 7:
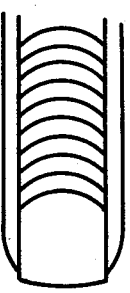
Figure 8:
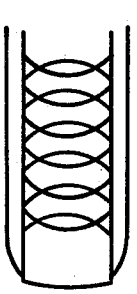

They can be curbed as shown in Fig. 7, or form two curved patterns the concave sides of which are turned in opposite directions as shown in Fig. 8.

Whatever may be the pattern of the grooves or channels, it is indispensable that the water which penetrates into them shall be expelled when the grooves are in contact with the ground. It is, in fact, quite evident that if that was not the case, the water imprisoned in the grooves would oppose the deformation of the tread and the results claimed above would not be obtained.

Figure 9:
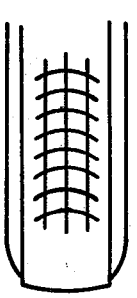

In order to permit the discharge of the water, the channels or grooves can be allowed to open out on each side of the tread as shown in Figs. 4 to 8 or they may be connected by one or more circular grooves as shown in Fig. 9.

Figure 10:
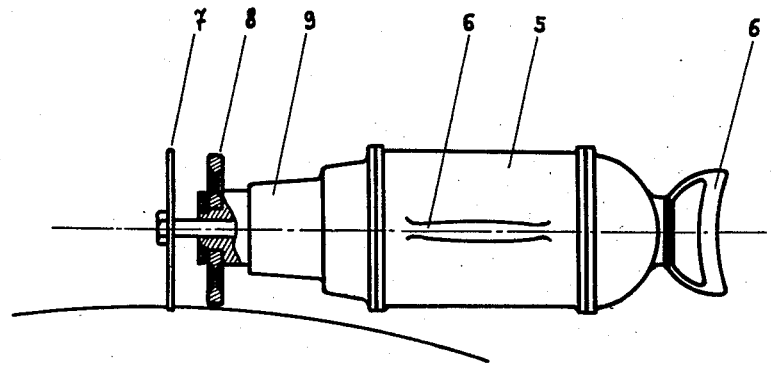
Fig. 10 shows an apparatus arranged to form the grooves in a pneumatic tire.
Figures 11, 12:
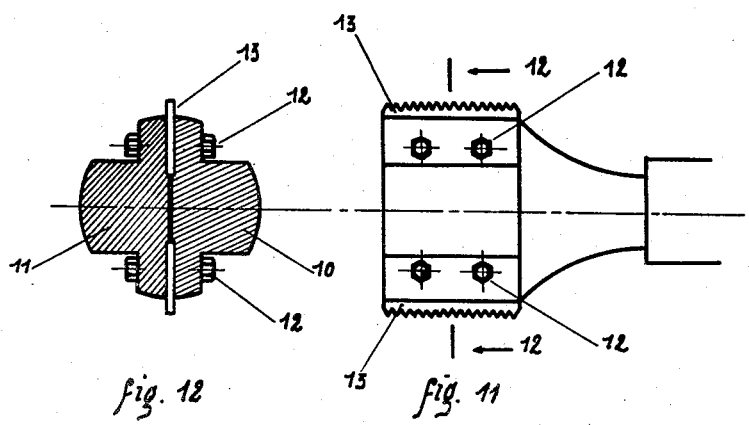
Fig. 11 shows a tool adapted to be used in the apparatus shown in Fig. 10.
Fig. 12 is a section on the line 12—12 in Fig. 11.

These different grooves or channels can be formed in the surface of the tread by the aid of an apparatus comprising a saw or a milling cutter turning at great speed, such as that shown in Fig. 10. In that figure, 5 represents an electric motor, such as the motor of a hand drill, having two handles 6—6 by which it can be gripped and held firmly in the hand. On the shaft of the motor is fixed a circular saw 7, the thickness of which is equal to the width of the grooves to be formed, or a fraising tool or a milling cutter of suitable profile when it is desired to make the grooves of triangular section. In order to control the penetration of the saw into the tire a roller 8 of a diameter slightly less than that of the saw is mounted on the extension 9 of the motor casing. For certain sections of grooves, it is advantageous to use a fraising tool with blades 13 as shown in Figs. 11 and 12, said tool comprising a mandrel in two parts 10 and 11, which are held together by bolts 12 and hold the blades between them. These blades are in the form of saw teeth of suitable section. The half-mandrel 10 has an extension 14 which can be engaged in the tool hold of the motor 5.

I claim:—

1. A pneumatic tire having minutely spaced transverse grooves in its tread, said grooves having depths of from one to five times their widths thereby defining strips which tilt under tangential strain to cause one side of a strip under strain to contact with the adjacent side of the adjacent strip and present the opposite edge of the strip to the roadway angularly.

2. A pneumatic tire having minutely spaced transverse grooves in its tread, said grooves having depths of from one to five times their widths and being spaced apart from one and one-half to fifteen times their widths thereby defining strips which tilt under tangential strain to cause one side of a strip under strain to contact with the adjacent side of the adjacent strip and present the opposite edge of the strip to the roadway angularly.

3. A pneumatic tire having minutely spaced transverse grooves in its tread, the widths, depths and spacing of said grooves being substantially in the proportions of 1.5 to 3 to 6 respectively thereby defining strips which tilt under tangential strain to cause one side of a strip under strain to contact with the adjacent side of the adjacent strip and present the opposite edge of the strip to the roadway angularly.

4. A pneumatic tire having minutely spaced rectangular radial grooves in its tread, said grooves having depths of from one to five times their widths thereby defining strips which tilt under tangential strain to cause one side of a strip under strain to contact with the adjacent side of the adjacent strip and present the opposite edge of the strip to the roadway angularly.

5. A pneumatic tire having minutely spaced rectangular transverse radial grooves in its tread, said grooves having depths of from one to five times their widths and being spaced apart from one and one-half to fifteen times their widths thereby defining strips which tilt under tangential strain to cause one side of a strip under strain to contact with the adjacent side of the adjacent strip and present the opposite edge of the strip to the roadway angularly.

6. A pneumatic tire having closely spaced grooves in its tread, said grooves having depths of from one to five times their widths, thereby defining strips which tilt when subjected to strain, to cause one side of a strip under strain to contact with the adjacent side of the adjacent strip and present the opposite edge of the strip to the roadway angularly.

7. A pneumatic tire having a plurality of closely spaced and generally parallel grooves in its tread surface, said grooves being generally rectangular in cross-section and having depths of from one to five times their widths and spaced from each other by strips having widths greater than the widths of the grooves but sufficiently narrow to allow their flexure into contact with one another when subjected to strain by frictional contact with the surface of the road.

8. A pneumatic tire having closely spaced grooves in its tread, said grooves being of substantially greater depth than width and defining separated strips which tilt when subjected to strain, thereby to cause the strip to present a corner edge to the surface of the pavement upon which the tire rests and insure non-skidding contact of the tire with the pavement.

9. A pneumatic tire having a plurality of closely spaced parallel grooves in its tread surface, said grooves being generally rectangular in cross section and having depths several times their widths and spaced from each other by strips of sufficient narrowness to allow their flexure into contact with one another when loaded and subjected to strain incidental to frictional contact of the tire with the surface of a road.

S. D'AYGUESVIVES.